United States Patent
Rupe et al.

(10) Patent No.: US 7,110,524 B2
(45) Date of Patent: Sep. 19, 2006

(54) METHOD AND SYSTEM FOR CALL QUEUEING AND CUSTOMER APPLICATION INTERACTION

(75) Inventors: Jason Rupe, Lafayatte, CO (US); Earl Tegan, Lakewood, CO (US)

(73) Assignee: Qwest Communications International, Inc., Denver, CO (US)

(*) Notice: Subject to any disclaimer, the term of this patent is extended or adjusted under 35 U.S.C. 154(b) by 313 days.

(21) Appl. No.: 09/923,984

(22) Filed: Aug. 7, 2001

(65) Prior Publication Data

US 2003/0031309 A1     Feb. 13, 2003

(51) Int. Cl.
*H04M 3/00* (2006.01)

(52) U.S. Cl. .................... 379/265.02; 379/265.01; 379/265.11; 379/265.1

(58) Field of Classification Search ........... 379/265.01, 379/265.02, 265.11, 265.1, 266.01
See application file for complete search history.

(56) References Cited

U.S. PATENT DOCUMENTS

| | | | | |
|---|---|---|---|---|
| 5,703,943 A * | 12/1997 | Otto | ............... | 379/265.11 |
| 5,978,467 A | 11/1999 | Walker et al. | ......... | 379/266.01 |
| 6,014,439 A * | 1/2000 | Walker et al. | ......... | 379/266.01 |
| 6,125,178 A | 9/2000 | Walker et al. | ......... | 379/211.01 |
| 6,603,854 B1 * | 8/2003 | Judkins et al. | ......... | 379/265.06 |

* cited by examiner

*Primary Examiner*—Wing Chan
*Assistant Examiner*—Karen Le
(74) *Attorney, Agent, or Firm*—Robert G. Crouch; Marsh Fischmann & Breyfogle LLP

(57) ABSTRACT

A system and method provide for the processing and routing of incoming calls for a call center. The system is specially configured such that incoming calls are prioritized and placed in a virtual queue if it is determined that a live call attendant is not available. While in the queue, the system is further configured such that the caller may initiate and participate in various interactive functions while simultaneously maintaining their priority position in the virtual call queue.

11 Claims, 4 Drawing Sheets

METHOD AND SYSTEM FOR CALL QUEUEING AND CUSTOMER APPLICATION INTERACTION

FIELD OF THE INVENTION

The present invention relates to a method and system for processing calls in a call center environment, and more particularly to a system and method that provides call queuing in a call center environment and further provide access to simultaneous interactive functions for caller while their call is in a queue prior to distribution to all attendants.

BACKGROUND OF THE INVENTION

Many organizations today, especially those which provide some sort of customer service, employ various forms of customer call centers in order to put customers in contact with parties affiliated with the organization which can provide assistance. A call center which is in connection with the public switch telephone network (PSTN), typically includes an automatic call distributor (ACD) which is employable to route incoming telephone calls to available live call attendants. In order to serve a maximum number of incoming callers, call centers are typically designed to optimize call handling efficiency and telephone attendant productivity.

Many conventional systems allow call attendants to service a greater number of customers by ascertaining the nature of a customer's request through collection of initial information from the customer, and then transferring the call to a voice response unit (VRU) to address the specific request of the customer. Other systems may reverse this process by connecting the customer initially to a VRU which is configured to automatically provide various interactive menus through which an incoming caller may move in order to access desired prerecorded information. Selections made by the incoming caller within the VRU may also be employed to route the caller to an appropriate call attendant.

When the number of incoming callers to a call center is greater than the number of available call attendants, a number of the incoming calls may be placed in a call queue. Call queuing works well for call center operators in that it minimizes idle time for attendants, provides for simultaneous handling of a greater number of calls, provides intelligent routing of calls to appropriate call attendants, and provides indication to incoming callers that they will be able to speak with a call attendant and not have to continuously try to establish a connection. In most call center configurations, once an incoming caller is positioned within a call queue, the to caller is subjected to recorded messages or music until their call is routed to an available call attendant. During this time, the caller has no ability to perform other functions without losing their place in the call queue.

SUMMARY OF THE INVENTION

The inventors have recognized that the call queuing function within a call center may be configured such that various interactive functions may be presented to an incoming caller while a caller is in a call queue. These interactive functions may be configured such that if activated, may provide additional information or interaction to the caller and may be configured such that a caller will not lose his or her place in the call queue.

Described herein is a method and system for processing telephone calls received in a call center environment. The system may include a communication network interface device which is configurable for receiving and processing telephone calls received over a communications network as well as providing a number of automated interactive functions which a caller may employ to access further information in the system. These interactive functions may be controlled by voice or keypad and allow a caller to access data from various cites sites within the system. Depending on the interface employed, this information may be provided in text or audio form.

Also included in the system may be a queuing application which is in connection with the communications network interface. The queuing application may be configured so as to assign priorities to incoming calls and to simultaneously hold the incoming call in a call queue while access is provided to various interactive functions in the communications network interface.

Also included in the system may be a call distributing apparatus which is connected with the communications network interface and is configured to route incoming calls to designated destinations. According to the system described herein, the designated destination may include a live call attendant affiliated with the organization running the call center.

According to one configuration of the invention, the system described herein may be configured on a central office switch within a PSTN and may be configured to route incoming calls over a data network to a customer controlled PBX system. Alternatively, the system may be configured locally on customer premise equipment (CPE) which interfaces with the public switch telephone network.

In yet another configuration of the invention, the communications network interface may be configured on a voice response unit (VRU), which is interfaced with the PSTN. The VRU may be configured such that it receives telephone calls over the PSTN and prior to routing the calls within the system further provides a number of interactive menus which an incoming caller may access in order to retrieve selected information. Further, the VRU may be configured to extract identification information from an incoming call, such as automated number identification (ANI), which may then be employed to access record data about the particular incoming caller to assist in processing the call. More specifically, this retrieved caller information may be employed to determine the type of priority assigned to the incoming call when placed in the call queue. The queuing application may be configured on a network application server. The application server may include a queuing application specially configured to receive and place incoming calls in a call queue according to their assigned priority. When a predetermined condition is detected, the calls may be routed to remote locations in accordance with the assigned priority. Types of priority may include the order of the calls received, the type of service agreement with the caller, type of order placed, or the type of call attendant which the caller wishes to reach.

To provide for the routing of calls from the queues, the call distributing apparatus may be configured as an automatic call distributor (ACD). The ACD may be configured such that it monitors the availability of agents at a remote location and provide this availability information to the VRU and the call queue application so that when it is detected that an agent is available, the call may be routed accordingly.

In operation, calls are received at the network interface and a number of functions are performed. These functions may include presenting one or more interactive menus to the caller so that selections may be made as to the type of processing the call will receive. At this point, the caller information (i.e., ANI, etc.) may be extracted therefrom and this information employed to search for information about the caller such that priority information may be retrieved.

If the caller has chosen to be placed in a queue, a priority is generated and assigned to the caller. The call is placed in the queue until a detected event occurs. Once a detected event occurs depending on the priority, the call is routed to the selected destination. While in a queue, the caller may be simultaneously provided access to various automated interactive functions through which additional information may be accessed and retrieved. The caller may be further provided the option of being interrupted while employing the interactive functions such that their call may be routed to the selected destination upon occurrence of the detected event. Another option may be to complete all interactive functions before any routing of the call may occur.

As was discussed above, the selected destination may be a call attendant who will communicate with the caller in order to provide additional information. The detected event may comprise the detection that any or a particular call attendant has become available and may receive a routed call.

DETAILED DESCRIPTION

Figure 1:
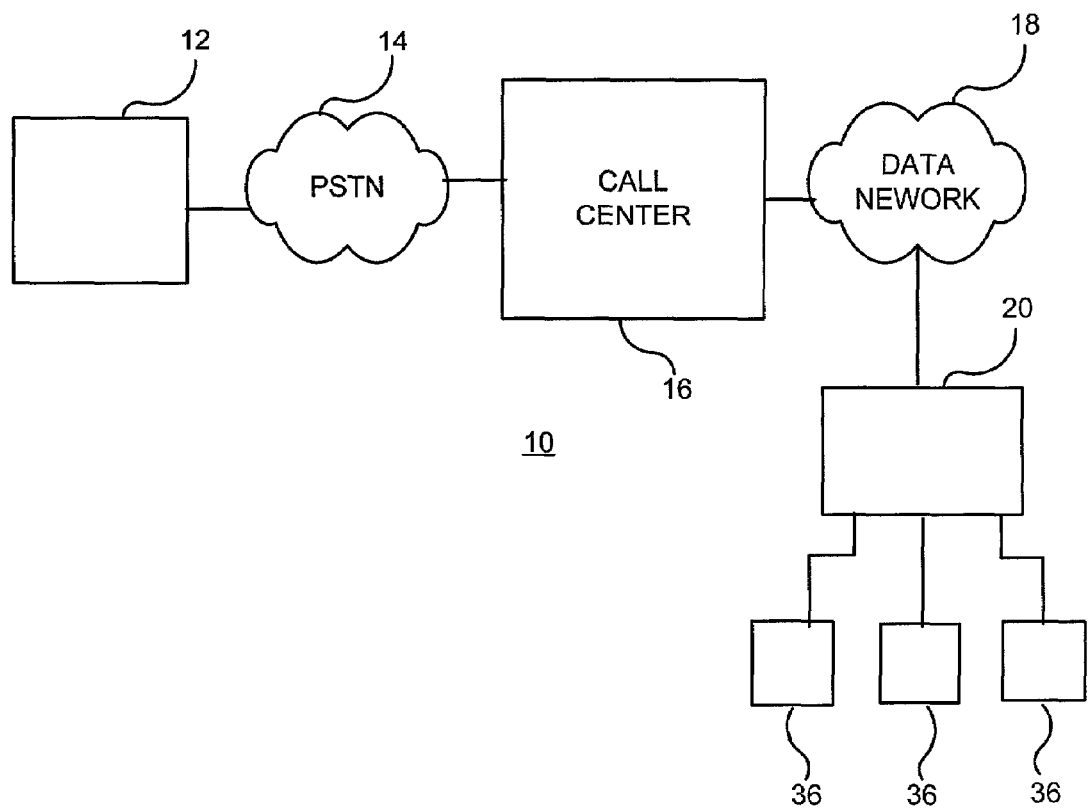
FIG. 1 discloses a network diagram which includes the communications system architecture within which the call center operates.

Disclosed in FIG. 1 is a system diagram which shows in particular the communication system architecture within which the call center system and method described herein operate. Included in this architecture is call center 16, which is in connection with the public switch telephone network (PSTN) 14. The call center 16 as will be described in greater detailed below, provides various forms of call processing for callers placing telephone calls over the PSTN 14 to a particular organization affiliated with the call center. In practice, a call center may be configured in any number of ways. It may be resident at a central office within the PSTN, or it may be resident at a business location and configured to run on any number of combinations of customer premise equipment (CPE). Within either location, the call center may be configured on one or more network servers or any other electronic platforms known to those skilled in the art which will support this type of functionality. In the configuration of the invention shown in FIG. 1, the call center is further in connection with a data network 18 for routing incoming calls to selected destinations. The data network 18 may comprise such things as a local area network (LAN), a wide area network (WAN), or any other type of communications network such as the PSTN. The type of communications network employed will depend on what type of call center configuration is employed, that is, whether it is resident in the central office within the PSTN, or it's configured on CPE. The destination may be a customer service center PBX system 20 which is employed to route calls to call attendants system 36. The call attendant 36 may comprise a telephone, a computer, a combination of both, or any combination of interface possibilities.

Figure 2:
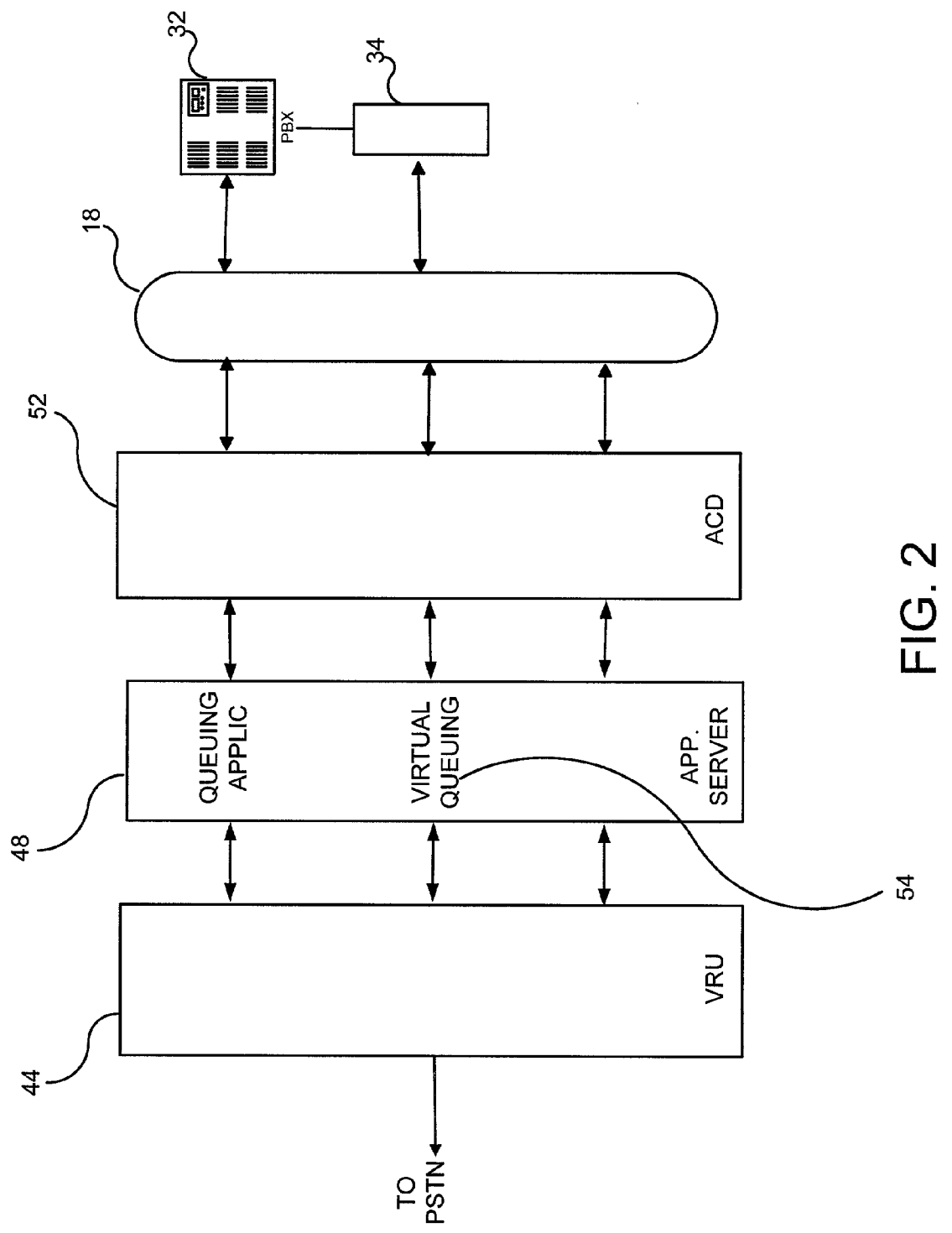
FIG. 2 discloses a system diagram for the call center.

Disclosed in FIG. 2 is a system diagram for the call center 16. Included in the system is voice response unit (VRU) 44 in connection with the PSTN which is configured to receive and process incoming telephone calls. The VRU 44 may comprise a voice computer which is configured to translate text into voice and voice into text to make existing database information accessible to access by phone. The features further associated with the VRU may include an interface for automatic speech recognition, speech to e-mail, e-mail to speech, speech to fax, and fax to speech routines. The VRU may be configured to present any number of interactive menus through which a caller may make selections either through voice recognition or manual interaction. Based on these selections, desired information may be located and retrieved from memory. The VRU is further configured for further call processing in that it may communicate with other components within the system to determine availability of all attendants, and if a determination is made that an attendant is not available, it may route the call for queuing until an attendant becomes available.

In connection with the VRU 44 is the application server 48. According to the system described herein the application server may be configured to perform many of the queuing functions with regards to holding and then routing calls to available attendants. The application server may include any number of applicants configured to perform these functions. In particular, it is seen that the system includes a queuing application 54 which is employable for positioning an incoming call in a virtual call queue 50. The queuing application, in conjunction with other components, may be configured to monitor the customer service center PBX 32 and manage the virtual call queue. If the customer service center PBX is busy (i.e., all call attendants are occupied), the queuing application virtually positions incoming calls in a virtual call queue, while the call remains hosted on the VRU. The VRU allows the caller to access other applications while positioning and holding the call in the virtual call queue.

The application server is further in connection with the automatic call distributor (ACD) 54. The ACD 54 may comprise a router or other computer device which is configured to distribute calls to appropriate destinations. Features generally associated with ACD 52 may comprise hosting live agents, distributing calls to remote agents and/or remote equipment, bridging multiple calls together, and transferring calls from attendant to attendant. According to the invention described herein the VRU 44 may generally relate to receiving calls and providing access to various functions within the system while the ACD 52 relates to transferring calls within the system.

Connecting the ACD 52 to the customer PBX 32, or other automated services which may be resident on network server 34, is communications network 18. As was mentioned above, the communications network 18 may comprise a LAN for providing communications over a local geographic area, a WAN for connecting a much larger area, and/or the PSTN. As was described above, the automated call routing function may be resident at a central office while, the tenant PBX and other automated services are resident at the client location. Also in connection with the data network 18 are the CTI link 34 which provides for establishing connection between PBX system 32 and the call attendants.

The system described herein is specially configured to provide processing for incoming calls to a call center, wherein the call center provide various functions such as call queuing and access to database information through any number of interactive menus. An organization may employ the call center system described herein for providing access to live call attendants who will provide assistance to parties calling in seeking information or assistance. When a caller is connected to the system, the system may provide options as to how the call is to be processed. In short, a caller may be directly connected to a call attendant, provided access to various interactive menus, be positioned in a queue until a call attendant becomes available, and/or provided access to various interactive functions while in the virtual queue.

In operations, calls are received at VRU 44 which is monitoring the current state of the customer PBX 32. Depending on how the system is configured, if it detected that there are no available live call attendants, the queuing application in application server 48 is employed and the call is placed in the virtual queue until a call attendant becomes available. According to the system described herein, the call remains resident simultaneously in both the VRU and the virtual queue. While in the VRU, a caller has the option to initiate various interactive functions which are hosted on the VRU. This may include accessing various audio menus which a caller may access information while in the queue. If this information is located before a transfer is initiated to a call attendant, a caller may then hang up and is effectively removed from the queue.

The queuing application 54 in application server 48 may also be reconfigured to assign a priority to incoming calls and position the calls within the virtual call queue according to this assigned priority. When a call attendant becomes available, the VRU 44 may transfer the call to the ACD 52 which in turn routes the call to the PBX based upon the calls priority in the call queue. For example, a plurality of the calls may be received by the VRU 44 requesting transfer to the same customer service center PBX 32. The priority numbers may be assigned to the calls and calls position in the virtual queue granted to the priority numbers. Many options exist for assigning priority numbers which may include first come first serve, terms of the callers service contract with the organization, size of order, whether long distance charges apply, availability of local call attendants, or the availability of language specific call attendants.

In a further example of the operation, the VRU may extract the ANI from an incoming customer telephone number and then using this information access a database in the system which includes customer specific information, such as a customer service agreement. Based on information retrieved from the database, a priority may be assigned to a particular caller in the queue which will affect when the caller will be connected to a live agent.

Figure 3A:
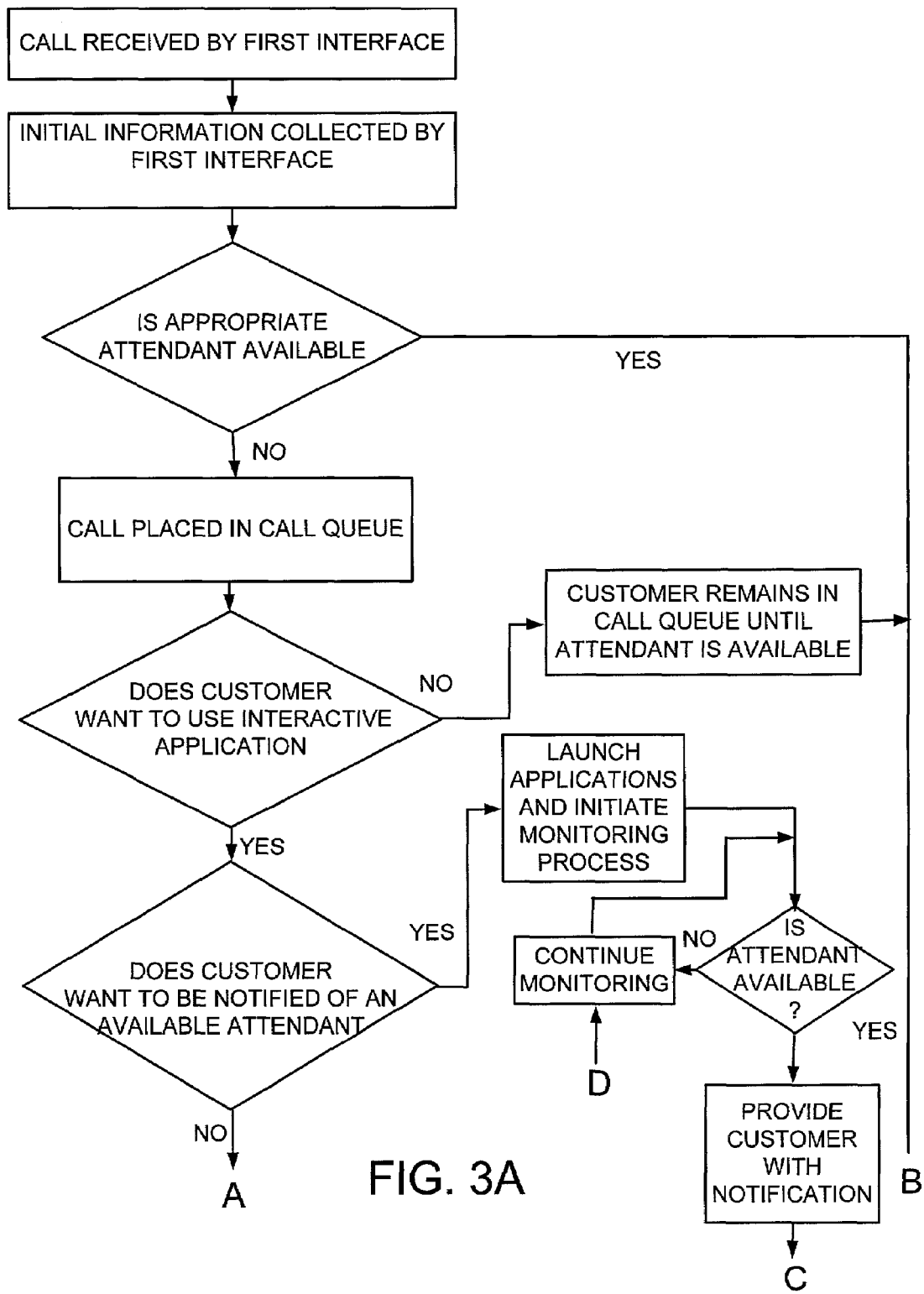
FIGS. 3A and B discloses a flow chart which describes one mode of operation for the call center.
Figure 3B:
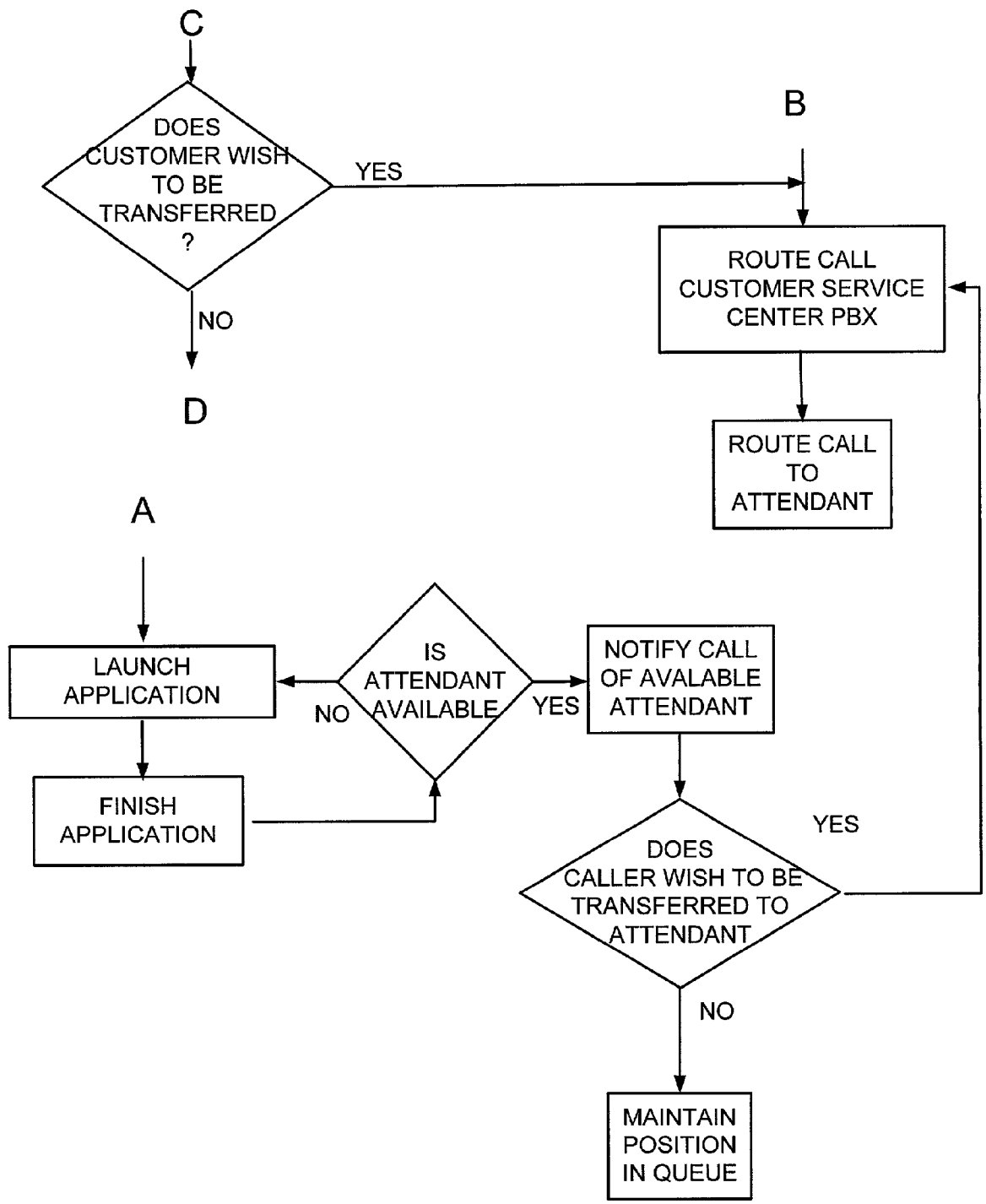

Disclosed in FIGS. 3A and B is a flow chart which describes in detail the steps performed by the system in processing each incoming call, including placing it in the queue, and eventually routing it to a call attendant. As an initial step, calls placed over the PSTN are received at the IVR and, based on how the system is configured, related information such as ANI may be extracted therefrom. This extracted information may then be used to access a remotely located database and retrieve information about the caller. The VRU may then query the customer PBX system to determine whether a call attendant is currently available. This analysis in determining whether an appropriate call attendant is available may be based on information extracted from the database, such as the service agreement, or may be based on selections made by the caller upon accessing various interactive menus within the VRU. If a call attendant is not available, the caller may be given the option of: (1) being placed in the virtual queue and waiting, (2) being placed in the virtual queue and being provided interactive functions which may be activated during the wait, (3) initiating automated functions without being placed in the queue, and/or (4) disconnecting.

If the caller wishes to be placed in the virtual queue, the queuing application assigns a priority to the caller based upon any number of the criteria identified above, and positions the call in the virtual call queue. If the caller has selected not to activate any of the interactive functions, the call will remain in the queue and will be transferred to a call attendant according to its assigned priority.

If a caller chooses to activate any of the interactive functions, a further option may be provided such that notification of an available attendant may be provided either during an interactive session or upon completion of the browsing. In either case, the caller may be given the option of connecting with the available attendant or continuing to browse. If the caller elects to continue browsing, the attendant may be placed on standby status until the caller elects to be connected, or notifications may be continually provided when other attendants become available. Theses notifications may be provided until the caller accepts or until they hang up.

When the caller chooses to be interrupted when a call attendant becomes available and once the interactive application is initiated, the VRU will then continually monitor the availability status of a call attendant, and once one becomes available, interrupt the interactive session and provide the option of being transferred to the available attendant or to continue to browse. If the election is made to speak with the available attendant, the connection is then established.

If the caller chooses not to be interrupted during the interactive session, the IVR will monitor the caller's use of the interactive function and once that function is complete, reinsert the caller in the virtual queue at their original priority position. While in an interactive session the caller may move to the top of queue and remain there until they choose to be transferred to a call attendant. Once a call attendant becomes available, the caller will then be transferred accordingly.

The foregoing description of the present invention has been presented for the purposes of illustration and description. Furthermore, the description is not intended to limit the invention to the form disclosed herein. Consequently, variations and modifications commensurate with the above teachings, skills, and knowledge of the relevant art are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A system for processing telephone calls comprising:
a communications network interface device configurable for receiving and proceasing of at least one incoming telephone call and providing access to at least one interactive application;
a queuing application in connection with the network interface which is configured to determine a priority number for the at least one incoming telephone call, to place, according to the priority number, placement of the at least one incoming telephone call in a call queue and to simultaneously hold the at least one incoming telephone call in the call queue while the at least one incoming telephone call is simultaneously hosted in the communications network interface;

said communications network interface device being further configured to provide access to one or more of the at least one interactive applications while the at least one telephone call is in the call queue; and a call distributing apparatus in connection with at least one communications network interface which is configured to route the at least one incoming call to a designated destination according to the priority number, wherein the priority number is further determined from monitoring the one or more interactive applications accessed.

2. The system of claim 1 wherein the destination is a customer telephone system which supports call attendants.

3. The system of claim 1 wherein at least one of: the communications network interface, the queuing application, the call distributing apparatus; are resident on customer premise equipment (CPE).

4. The system of claim 1 wherein the communications network interface Is configured on voice response unit (VRU) interfaced with the public switched telephone network (PSTN).

5. The system of claim 1 wherein the queuing application is configured on a network based application server.

6. The system of claim 1 wherein the call distributing apparatus is configured on an automatic call distributor (ACD).

7. The system of claim 6 wherein the ACE) routes the at least one incoming call to a customer PBX system over data network.

8. The system of claim 1 wherein the routing priority number is further determined based on at least one of: terms of the caller's service contract with the organization, size of order, whether long distance charges apply, availability of local call attendants, or the availability of language specific call attendants.

9. A method for call processing in a call center comprising the steps of:

receiving at least one incoming telephone call over a communications network;

collecting information relating to the at least one telephone call;

presenting at least one interactive audio menu which includes options for being placed in a queue in order to speak with a selected customer service representative, accessing one or more interactive applications while waiting in the queue and accessing only the interactive applications;

upon affirmative selection for being placed in the queue, assigning a routing priority number for routing the at least one telephone call to the selected customer service representative based on the collected information; and positioning the at least one telephone call in the queue based on the routing priority number; and presenting an option to be routed to the selected customer service representative upon occurrence of a detected event;

wherein the routing priority number is determined from monitoring the interactive applications selected during the at least one telephone call.

10. The method of claim 9 wherein the detected event comprises at least one of: a change in an availability status for the selected customer service representative, completion of one of the interactive applications, and a received indication from the at least one telephone call.

11. The method of claim 9 wherein the priority number is further determined based on at least one of: terms of the caller's service contract with the organization, size of order, whether long distance charges apply, availability of local call attendants, or the availability of language specific call attendants.

* * * * *